United States Patent [19]

Tanibata

[11] Patent Number: 5,429,245
[45] Date of Patent: Jul. 4, 1995

[54] CARTRIDGE STORING CASE

[75] Inventor: Toru Tanibata, Wakayama, Japan

[73] Assignee: Noritsu Koki Co., Ltd., Wakayama, Japan

[21] Appl. No.: 209,904

[22] Filed: Mar. 14, 1994

[30] Foreign Application Priority Data

Apr. 2, 1993 [JP] Japan .................. 5-076881

[51] Int. Cl.6 ........................................... B65D 85/672
[52] U.S. Cl. ..................... 206/578; 206/391; 206/455; 206/564
[58] Field of Search ............... 206/455, 456, 391, 564, 206/578, 232

[56] References Cited

U.S. PATENT DOCUMENTS

| 2,790,547 | 4/1957 | Sutton | 206/456 |
|---|---|---|---|
| 2,880,865 | 4/1959 | Knox | 206/564 |
| 3,877,766 | 4/1975 | Seebald | 206/456 |
| 4,723,655 | 2/1988 | Schreiber | 206/391 |
| 4,819,794 | 4/1989 | Silverstein et al. | 206/391 |
| 4,854,464 | 8/1989 | Kim | 206/455 |
| 5,209,352 | 5/1993 | Light et al. | 206/455 |
| 5,251,744 | 10/1993 | Dziersk et al. | 206/232 |
| 5,251,747 | 10/1993 | Hansen et al. | 206/232 |
| 5,261,535 | 11/1993 | Light et al. | 206/391 |
| 5,271,497 | 12/1993 | Blackman et al. | 206/232 |

FOREIGN PATENT DOCUMENTS

| 0550885 | 7/1993 | European Pat. Off. | 206/455 |
|---|---|---|---|
| 2620427 | 3/1989 | France | 206/455 |

Primary Examiner—Jimmy G. Foster
Attorney, Agent, or Firm—Armstrong, Westerman, Hattori, McLeland & Naughton

[57] ABSTRACT

A cartridge storing case having at least one recess designed to contain a cartridge into which a roll of film is wound to be accommodated. The case can range and store many cartridges efficiently, and index prints showing the contents of the films can be stored with the cartridges. User can quickly find out a specific film when they need it.

12 Claims, 7 Drawing Sheets

CARTRIDGE STORING CASE

BACKGROUND OF THE INVENTION

The present invention relates to a cartridge storing case for storing cartridges into which developed films are wound to be accommodated.

Conventionally, a developed film is cut into some pieces and stored in a pouch of translucent film (hereinafter refer to as a "film sheet"). The volume of such kind of film sheet is large so that storage of many developed films makes a considerable volume. Additionally, finding out of a specific film for a specific print takes a lot of time since users must hold the films directly to the light. Further, films stored in film sheets is likely to be folded.

It has been proposed to store a developed film in a cartridge which previously contained the undeveloped film or another cartridge. Thus, time and labor for cutting the developed film into some pieces can be omitted and expendable film sheets become unnecessary. In addition, cartridges can be reused, therefore the proposal fits the object of enviromental protection which is one of the most important themes in the world.

However, when a developed film is contained in a cartridge, users cannot see the contents of the developed film; consequently, they cannot find out a specific film immediately when they need the films. Also cartridges are compact, but are not formed flat so that they cannot be stored in bookcases and the like, which in turn causes a problem that they are likely to be lost.

In view of the above circumstances, it is an object of the present invention to provide a cartridge capable of efficiently containing cartridges. Also it is an object of the present invention to provide a cartridge storing case capable of containing index prints showing the contents of the films contained in cartridges, together with the cartridges, and of being ranged with albums in bookcases and the like.

SUMMARY OF THE INVENTION

In accordance with the present invention, there is provided a cartridge storing case having at least one recess designed to contain a cartridge into which a roll of film is wound to be accommodated.

Preferably, there is provided a containing portion for index prints showing the contents of the films accommodated in the cartridges.

It is preferable that the containing portion for index prints comprises a recess of approximately rectangular parallelepiped shape having a plurality of partitions.

Also, it is preferable that a cover capable of opening and shutting is attached to one end of the case, at least one sheet having small pockets for containing the index prints is provided, and the size of the case is the same as that of commonly used albums.

In the cartridge storing case of the present invention, the cartridge is fit in the recess to be stored. Index prints showing the contents of films contained in the cartridges can also be contained. When the size of the cartridge storing case is the same as that of albums, it can be arranged with albums in a bookcase and the like so that it needs a little space and looks neat.

DETAILED DESCRIPTION

A cartridge storing case according to the present invention will now be described with reference to the attached drawings.

Figure 1:
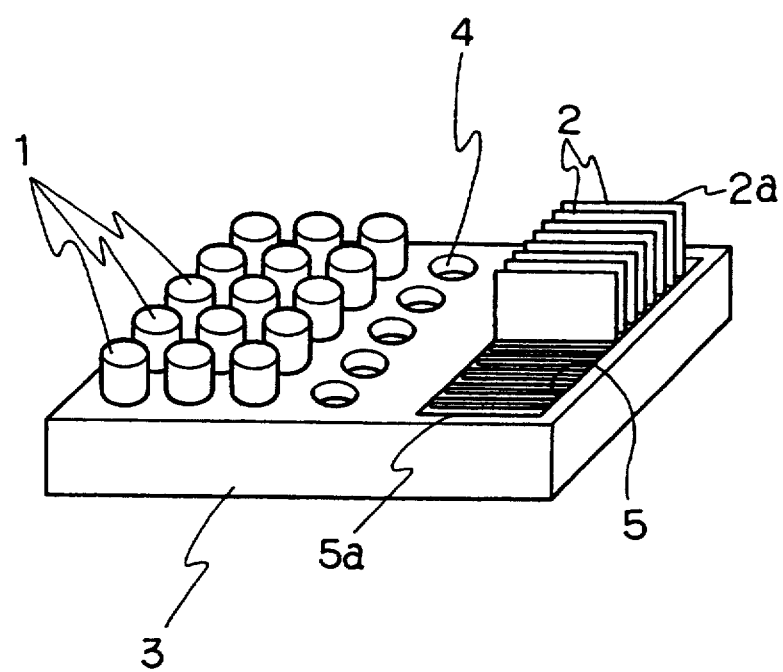
FIG. 1 is a perspective view of one embodiment of a cartridge storing case of the present invention.
Figure 5:
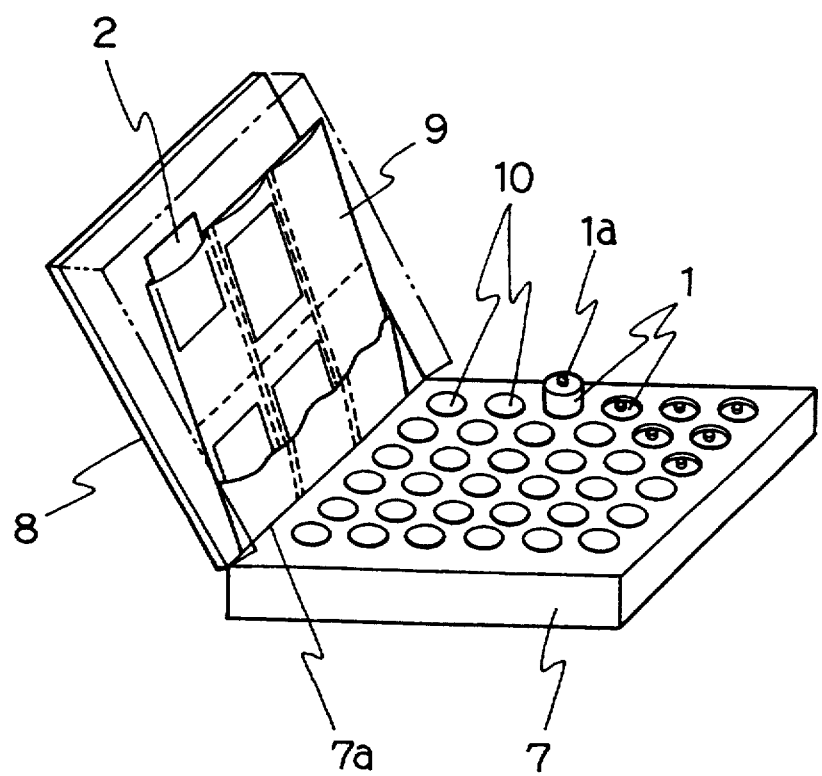
FIG. 5 is a perspective view of another embodiment of a cartridge storing case of the present invention.

FIG. 1 shows a cartridge storing case wherein cartridges are stored horizontally. FIG. 5 shows a book-style cartridge storing case which can be stored vertically with albums in a bookcase and the like.

In FIG. 1, numeral 1 denotes a cartridge, numeral 2 an index print, numeral 3 a cartridge storing case, numeral 4 a recess in which a cartridge can be contained and numeral 5 a containing portion for the index print 2.

As described later, a developed film is wound and contained in the cartridge 1. The content of the film is shown in the index print 2. The index print 2 shows images of frames in the film in numeral order. When many frames are existing in the film and all the frames are shown in one sheet of print, one image is too small for users to distinguish the other images. In such case, a plurality sheets of index print are preferably used to clearly show the images of the film.

The same identification numbers and the like are assigned to a cartridge 1 and a corresponding index print 2 so that users can know correspondence therebetween. To show identification numbers on the cartridges 1 and the index prints 2, labels on which identification numbers are printed, are sticked to the index prints or these numbers are directly printed on them.

The cartridge storing case 3 has a plurality of recesses 4 and a containing portion 5 at upper part thereof and is put horizontally on a surface. It is also preferable that several cases are piled up like drawers.

Figure 2:
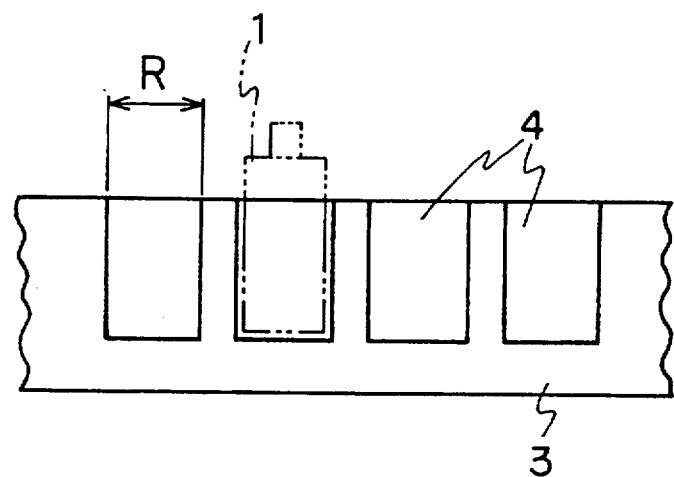
FIG. 2 is a sectional view of an example of a recess in FIG. 1.
Figure 3:
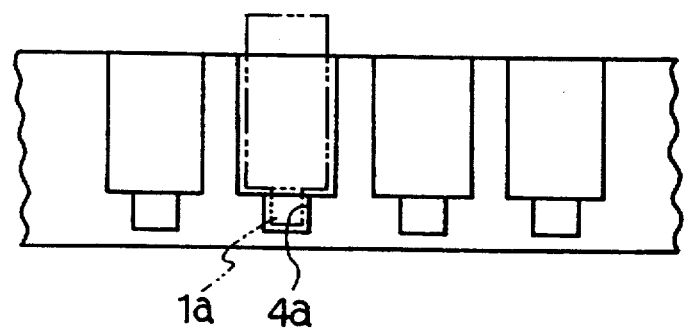
FIG. 3 is a sectional view of another example of a recess in FIG. 1.

The recess 4 contains a cartridge vertically for efficient containing, and as shown in FIG. 2, is a cylindrical recess which is so made as to have outer diameter R slightly larger than that of the cartridge 1. Also, as shown in FIG. 3, a small cylindrical recess 4a is preferably formed at the bottom of the recess 4 so that a spool 1a extruding from the center of the cartridge 1 can be contained in the recess 4a. The recess 4 might be so deeply formed that the cartridge 1 is entirely contained therein. However, users can easily take out the cartridge by picking it up with fingers when the recess 4 is so deeply formed that a top portion of the cartridge extrudes from the recess 4. In any case, it is preferable that the cartridges 1 are contained in the recess 4 in such a manner that users can distinguish the identification numbers without taking out the cartridges.

Figure 4:
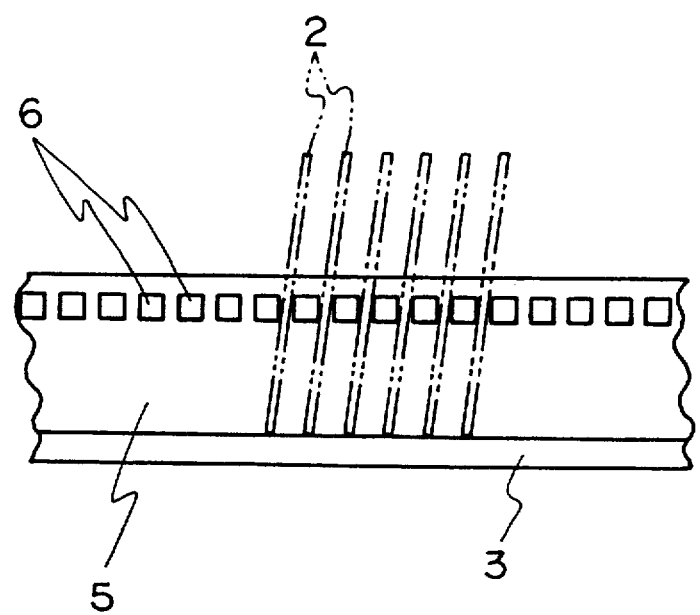
FIG. 4 is a sectional view of a containing portion for index prints shown in FIG. 1.

The containing portion 5 for the index print 2 is an approximately rectangular parallelepiped recess which is so formed that a side 5a thereof is slightly larger than a side 2a of the index print 2. As shown in FIG. 4, several bars 6 for partitioning the index prints 2 are disposed at suitable intervals at an upper part of the containing portion 5. Index prints 2 are partitioned every sheet or every several sheets and can be held vertically. If the depth of the containing portion 5 for the index print 2 is so determined that the upper part of the index print 2 extrudes from the containing portion 5, users can easily take out the index prints 2. If it is the case where users do not wish to take out the index prints, they can look through whole the index prints 2 smoothly by turning over them, and can easily search specific prints.

Another embodiment of a cartridge storing case of the present invention is described herebelow based on FIG. 5.

In FIG. 5, a cover 8 is attached to an end 7a of the cartridge storing case 7 and an index print sheet 9 is provided thereon. When the length and width of the cartridge storing case 7 are so designed to be the same as those of ordinary albums, the cartridge storing case can be stored in a bookcase in order and neatly if it is stored with albums. Storing space is effectively used in that case.

The cover 8 is a sheet and one end thereof is attached to the edge of the cartridge storing case 7 by hinges or adhesive tape so that the cover 8 can be opened and shut freely. The cover 8 serves to store the cartridge storing case vertically in a bookcase and the like. In such case, it is preferable that a recess 10 is formed so deeply that the cartridge 1 is entirely contained and that the cartridge 1 is so contained in the recess 10 that the extruded spool 1a directs upward in order to allow users to take out the cartridge with picking up the spool 1a. Also the cover 8 is preferably a box-type cover having three sides as shown in chain double-dashed line. In such case, the cartridge might slightly extrude from the recess 10.

The index print sheet 9 has many small pockets divided by transparent film and contains the index prints 2. The sheet 9 is provided on an attaching portion of the cover 8 to form a booklet.

Figure 6:
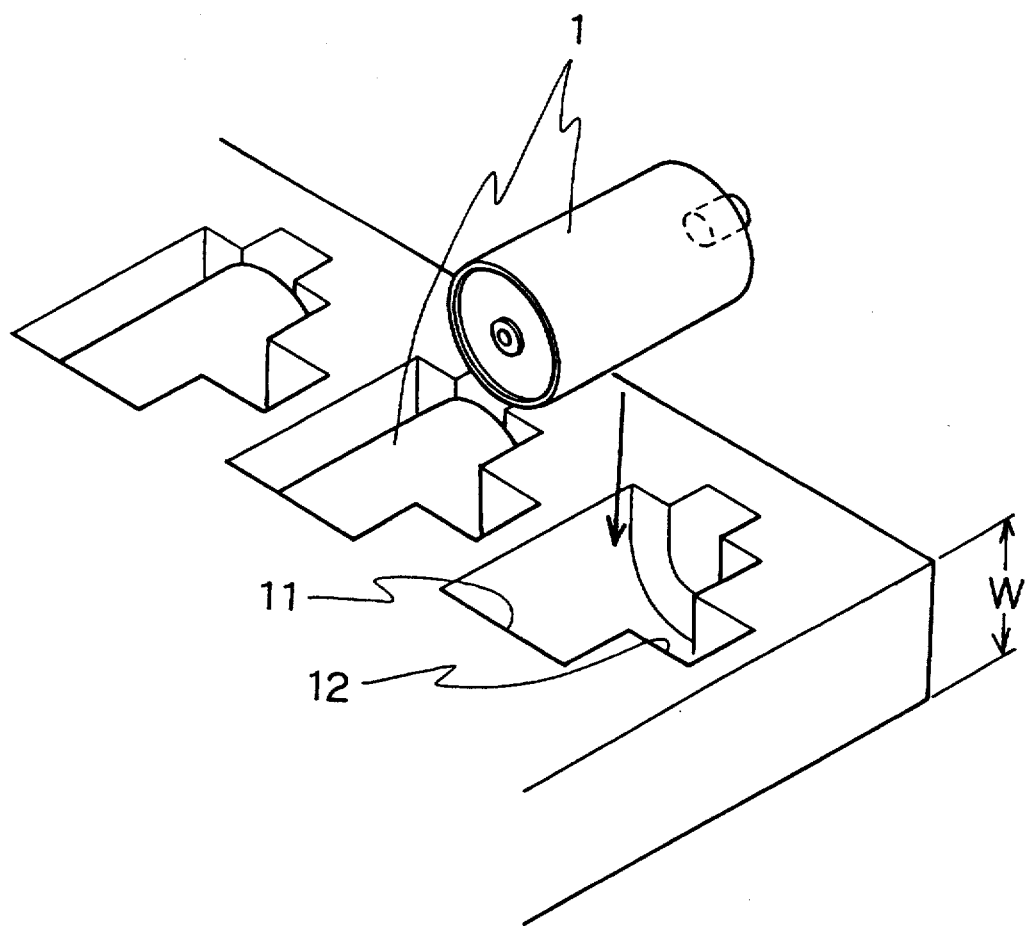
FIG. 6 is a perspective view of the other example of a recess which can contain a cartridge.

Further, as shown in FIG. 6, a recess 11 might be so formed as to contain the cartridge 1 horizontally when small thickness W of the cartridge storing case 7 is desired. In such case, formation of a lateral groove adjacent to the recess 11 which allows users to insert their fingers would facilitate taking out of the cartridge 1.

Figure 7:
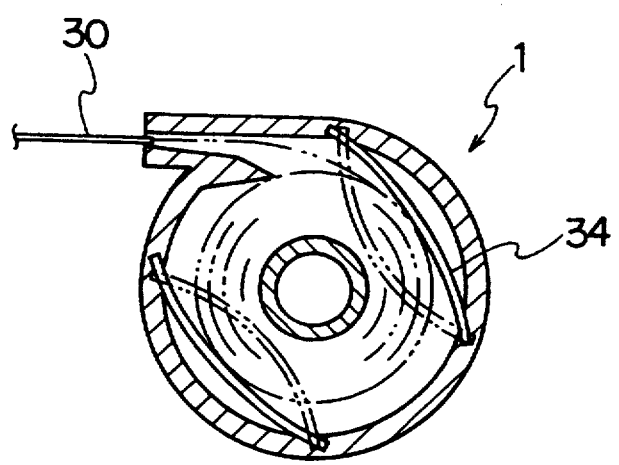
FIG. 7 is an explanatory section of the cartridge for showing the internal structure thereof.

FIG. 7 is an explanatory section of a cartridge for showing the internal structure thereof. The film having been developed and printed is conveyed along a conveyer guide (not shown) and led into the cartridge 1 along a film guide 30 disposed adjacent an inlet of the cartridge 1.

Figure 8:
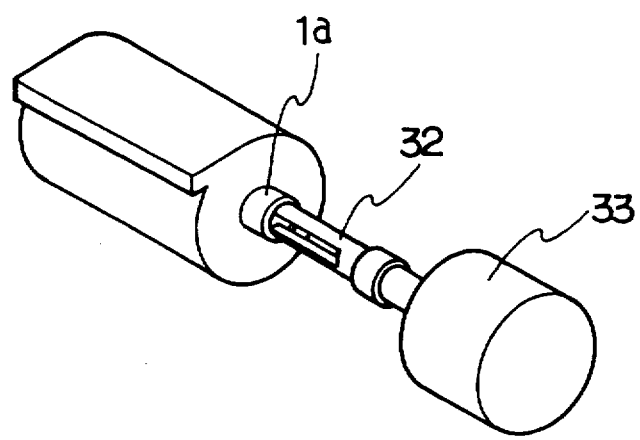
FIG. 8 is an explanatory view showing the relationship between the cartridge and a motor.
Figure 9:
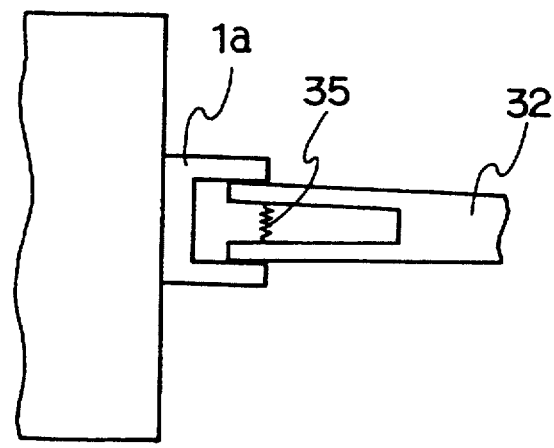
FIG. 9 is an explanatory view showing a spool connected to a coupling.

When the leading end of the film enters the cartridge 1, a motor 33 connected to a spool 1a of the cartridge 1 through a coupling 32 is actuated to rotate the spool 1a for winding the film as shown in FIG. 8. In this case, a plate spring 34 serves to urge the film against the spool 1a, so that the film is assuredly wound by the rotation of the spool 1a. Note that in FIG. 7 the plate spring 34 in a condition where the film is absent in the cartridge 1 is drawn in chain double-dashed line. As can be seen from FIG. 7, the plate spring 34 is disposed so as to press the film against the spool 1a. As shown in FIG. 9, the coupling 32 forks into two branches toward the cartridge 1, and a spring 35 is provided between the two branches to urge them in such a direction as to enlarge the space therebetween. This urging force of the spring 35 permits the coupling 32 to connect to the spool 1a and, hence, the rotating force of the motor 33 can be transmitted to the spool 1a.

As described above, the cartridge storing case according to the present invention can range and store many cartridges efficiently, and index prints showing the contents of the films contained in the cartridges can be stored with the cartridges. Therefore, users can quickly find out a specific film when they need it, and film missing does not occur. Also, when the cartridge storing case is so formed to be stored vertically with albums in a bookcase and the like, it takes a little space and looks neat.

Though several embodiments of the present invention are described above, it is to be understood that the present invention is not limited only to the abovementioned and various changes and modifications may be made in the invention without departing from the spirit and scope thereof.

What is claimed is:

1. In combination:
   a cartridge storing case, comprising:
   a plurality of recesses formed in a side of said case and each designed to contain a cartridge into which a roll of film is wound to be accommodated;
   a containing portion for index prints showing the contents of the films accommodated in the cartridges, said containing portion having means for supporting a plurality of index prints in a row and extending through said side of said case such that an upper portion of the index prints extends above said side;
   at least one cartridge into which a roll of film is wound to be accommodated stored within one of said recesses;
   at least one index print showing the contents of the films accommodated in the cartridges stored in said containing portion.

2. The combination of claim 1, wherein said recesses are sized such that said at least one cartridge extends above said side such that it can be viewed and grasped with one's fingers.

3. The combination of claim 2, wherein said at least one cartridge has a narrow spool portion extending upwardly therefrom and above said side.

4. The combination of claim 2, wherein said at least one cartridge has a narrow spool portion extending downwardly therefrom and said case includes a small recess at a lower end thereof for receiving said spool.

5. The combination of claim 1, wherein said side of said case is generally flat and has a generally narrow width from said side to an opposite base side of said case opposite to said side and upon which said case rests.

6. The combination of claim 5, wherein said case is generally flat and rectangular.

7. The combination of claim 1, wherein said side of said case is generally flat and said case has a generally narrow width from said side to an opposite side of said case opposite to said side and wherein said case is generally flat and rectangular.

8. The combination of claim 1, wherein said case is about the size of a commonly used album.

9. In combination:
   a cartridge storing case comprising:
   a plurality of recesses formed in a side of said case and each designed to contain a cartridge into which a roll of film is wound to be accommodated;

a cover capable of opening and shutting such as to uncover and cover, respectively, said recesses formed in said side pivotally attached to one end of said case;

a containing portion for index prints showing the contents of the films accommodated in the cartridges, said containing portion having at least one sheet having a plurality of small pockets for containing index print, said at least one sheet being pivotable over said side along with said cover such as to be able to be pivoted over said side and away from said side along with said cover;

at least one cartridge into which a roll of film is wound to be accommodated stored within one of said recesses;

at least one index print showing the contents of the films accommodated in the cartridges stored in said containing portion.

10. The combination of claim 9, wherein said recesses are sized such that said at least one cartridge does not extend above said side such that it will not protrude therefrom to facilitate closing of said cover.

11. The combination of claim 10, wherein said at least one cartridge has a narrow spool portion extending upwardly therefrom which can be grasped to remove said at least one cartridge.

12. The combination of claim 9, wherein said recesses are sized such that said at least one cartridge lays generally horizontally therein and a lateral groove is provided adjacent each said recess to facilitate removal of said at least one cartridge.

* * * * *